US006786358B1

(12) United States Patent
Suzuki

(10) Patent No.: US 6,786,358 B1
(45) Date of Patent: Sep. 7, 2004

(54) CLIP CASE

(75) Inventor: Hitoshi Suzuki, Tokyo (JP)

(73) Assignee: Hiromori Inc., Tokyo (JP)

(*) Notice: Subject to any disclaimer, the term of this patent is extended or adjusted under 35 U.S.C. 154(b) by 0 days.

(21) Appl. No.: 10/290,967

(22) Filed: Nov. 8, 2002

(51) Int. Cl.[7] .................................................. B23Q 7/04
(52) U.S. Cl. ...................................................... 221/212
(58) Field of Search .................. 221/212, 24; 206/340, 206/350, 818; D9/308

(56) References Cited

U.S. PATENT DOCUMENTS 2,453,021 A * 11/1948 Konelsky .................... 292/194
D159,581 S * 8/1950 Boots .......................... D9/308
2,544,114 A 3/1951 Steinberg
3,269,528 A 8/1966 Leedy
3,587,835 A 6/1971 Shore
5,078,300 A * 1/1992 Heu ........................... 221/212
5,096,091 A * 3/1992 Heu ........................... 221/212
6,450,365 B1 9/2002 Yamazaki

FOREIGN PATENT DOCUMENTS

| | | |
|---|---|---|
| EP | 0452523 A1 * | 10/1991 |
| GB | 2241692 | 9/1991 |
| GB | 2241693 | 9/1991 |
| JP | 2-85184 | 3/1990 |

* cited by examiner

*Primary Examiner*—David H Bollinger
(74) *Attorney, Agent, or Firm*—Dilworth & Barrese LLP.

(57) ABSTRACT

The present invention is directed to a magnetic holder for paper clips or other magnetizable items and substantially in the shape of a wing or an aileron. The items can be removed from within the container by rotating an at least partially magnetic spindle rotatably mounted across an opening through the container, in either of two opposite directions.

8 Claims, 3 Drawing Sheets

CLIP CASE

The present invention is directed to a clip case, i.e. a holder for small metallic items that are magnetizable such as paper clips, commonly known as gem clips. More particularly, the present invention is directed to such a clip holder or case which facilitates both retention and withdrawal of paper clips therefrom.

Paper clip cases and holders have been available for quite some time to retain small metallic objects that are magnetizable, notably paper clips, e.g., upon an office desk. There is a need to securely retain the gem clips in a case or holder so that the clips do not scatter; at the same time, there is a need to expedite withdrawal of such clips from the case in a smooth, quick manner. Attaining these needs has often been mutually exclusive.

For example, a prior art gem clip holder can be found in Japanese Patent Laid-Open HEI.-2 (1990)-85184 which is directed to an easy-to-use handy case for storing small metallic utensils such as gem clips 12. According to this prior art embodiment, the container 2 holding the gem clips 12 moves along a cylinder 1, to come in contact with magnets 5*a*, 5*b*, 5*c*, positioned at the top of the cylinder 1. All the magnets 5*a*, 5*b*, 5*c* are installed along the cylinder 1 in overlapping fashion with magnetic force lines pointing in the same direction. The device disclosed in HEI.-2 (1990)-85184 can be unstable in that a large container 2 must move up and down a fairly narrow spindle or cylinder 1. Furthermore, the container 2 is open at the top thereof so clips can be explicitly removed therefrom as shown, e.g., in FIGS. 6*a–c*. Thus, retained clips 12 are in danger of inadvertently falling out of the open container 2, especially if the unstable container 2 is jostled and/or knocked over.

U.S. Pat. No. 2,544,114 to Steinberg discloses a dispenser 10 for hairpins 9 in which the pins 9 are extracted upwardly through apertures 18, 19 radially positioned about an upper lid 12 upwardly biased about a center post 13 by a spring 14 (magnets 20 and 20 are adjacently positioned to the apertures 18, 19 on the lid). It is necessary for the legs of the hairpin 9 to be cammed inwardly to be extracted through apertures 18 and 19 (column 3, lines 6–14). U.S. Pat. No. 3,269,528 to Leedy and U.S. Pat No. 3,587,835 to Shore disclose paper clip containers designed for storage and removal of the paper clips through open tops thereof. U.S. Pat. No. 6,450,365 to Yamazaki also discloses a gem clip case with holder 1 in which the clips 2 are magnetically stored and removed through a top opening 6.

UK Pat. Appln. No. GB 2,241,693 to Hsu discloses a case 1 for paper clips, tacks, etc. having an interior curvelinearly inclining space 14 with a cylindrical magnetic roller set 2 rotatably mounted adjacent a lowest portion of the interior space 14. The cylindrical roller set 2 itself is composed of two hollow cylinders 21 and 22 connected together by an inner sleeve 23, with two circular magnets connected to opposite ends of the inner sleeve 23 and received within the hollow cylinders 21 and 22 (FIG. 1). Paper clips, tacks, etc. 5 are removed from the interior 14 of the casing 1 by rotating the roller set 2 as shown in FIG. 3 to upwardly move the clips 5 between the roller set 2 and top cover plate 34 which can be lifted for replenishing the interior 14 with paper clips, tacks, etc. Fairly precise dimensions would appear to be required to ensure clips 5 can pass upwardly between roller set 2 and cover plate 34, with the cover plate securely removable from and securable to the cover 3, to allow paper clips, tacks 5, etc. to be replenished within the interior.

UK Pat. Appln. No. GB 2,241,692 to Hsu discloses a casing 1 for paper clips 6 having an inner sloping container 2 and cover 3, with paper clips 6 being upwardly removed therefrom by rotating a disc wheel 4 having magnets 42 radially disposed thereabout, such that rotating clips 6 are lifted through an upper slot 311 in the cover 3 and fall upon an upper bearing surface 33 of the cover 3, as shown in FIG. 4. This embodiment requires, among other features, precise dimensions for removing clips 6 upwardly through the slot 311.

SUMMARY OF THE INVENTION

Accordingly, it is an object of the present invention to provide a new and improved case or holder for small metallic utensils such as paper or gem clips.

It is a more detailed object of the present invention to provide such a gem clip case or holder which facilitates both storage within and withdrawal of the clips therefrom.

It is another object of the present invention to provide a case or holder for gem clips which allows for easy introduction of individual clips thereinto, secure retention of individual clips therein and, at the same time, facilitates withdrawal of the clips therefrom.

It is a further object of the present invention to provide such a container which can be easily manufactured with minimal number of separable components.

It is yet another object of the present invention to minimize need for precise tolerances or clearances in manufacturing such a case or holder.

These and other objects are attained by the present invention which is directed to a case for retaining paper clips or other magnetizable items, comprising a container substantially in the shape of a wing or an aileron. An at least partially magnetized spindle is rotatably mounted upon the container to remove the clips by rotating in either of two opposite directions.

More particularly, the case comprises a container body having a hollow interior for containing and storing the items, and an opening or slit at a front end thereof for removing the clips from the interior. A cylindrical body, i.e. spindle, is rotatably mounted at this front end of the container. At least one, preferably disc-shaped magnet is mounted within the spindle.

When the spindle is rotated, items attracted to the magnetic spindle from within the container interior are rotated outside of the container and easily removed for use. At the same time, clips can be easily and securely stored within the container, e.g., by inserting the clips between the spindle and container or through a lateral opening provided in another side of the container. A space is provided both above and below the rotating spindle.

Thus, not only are paper clips and the like more easily removed from a clip case or holder of the present invention, but the clips are more easily and securely introduced and stored in the inventive clip case, with minimal danger of inadvertently falling out therefrom. The inventive clip case is extremely easy to assemble and use, having a minimal number of separate parts that must be fastened together. Indeed, the only movable part in the inventive case is the rotating spindle, with the main container being integrally formed in a preferred embodiment. When the main container and interior are shaped as a wing or an aileron, with the rotating spindle mounted at a larger open end thereof, ease of introduction, storing and retrieving paper clips is especially facilitated. Precise tolerances or clearances are not required for manufacturing the inventive case which successfully operates over a wide range of clearance between the rotating spindle and container.

BRIEF DESCRIPTION OF THE DRAWINGS

The present invention will be described in greater detail with reference to the accompanying drawings in which.

DESCRIPTION OF THE PREFERRED EMBODIMENTS

Figure 1:
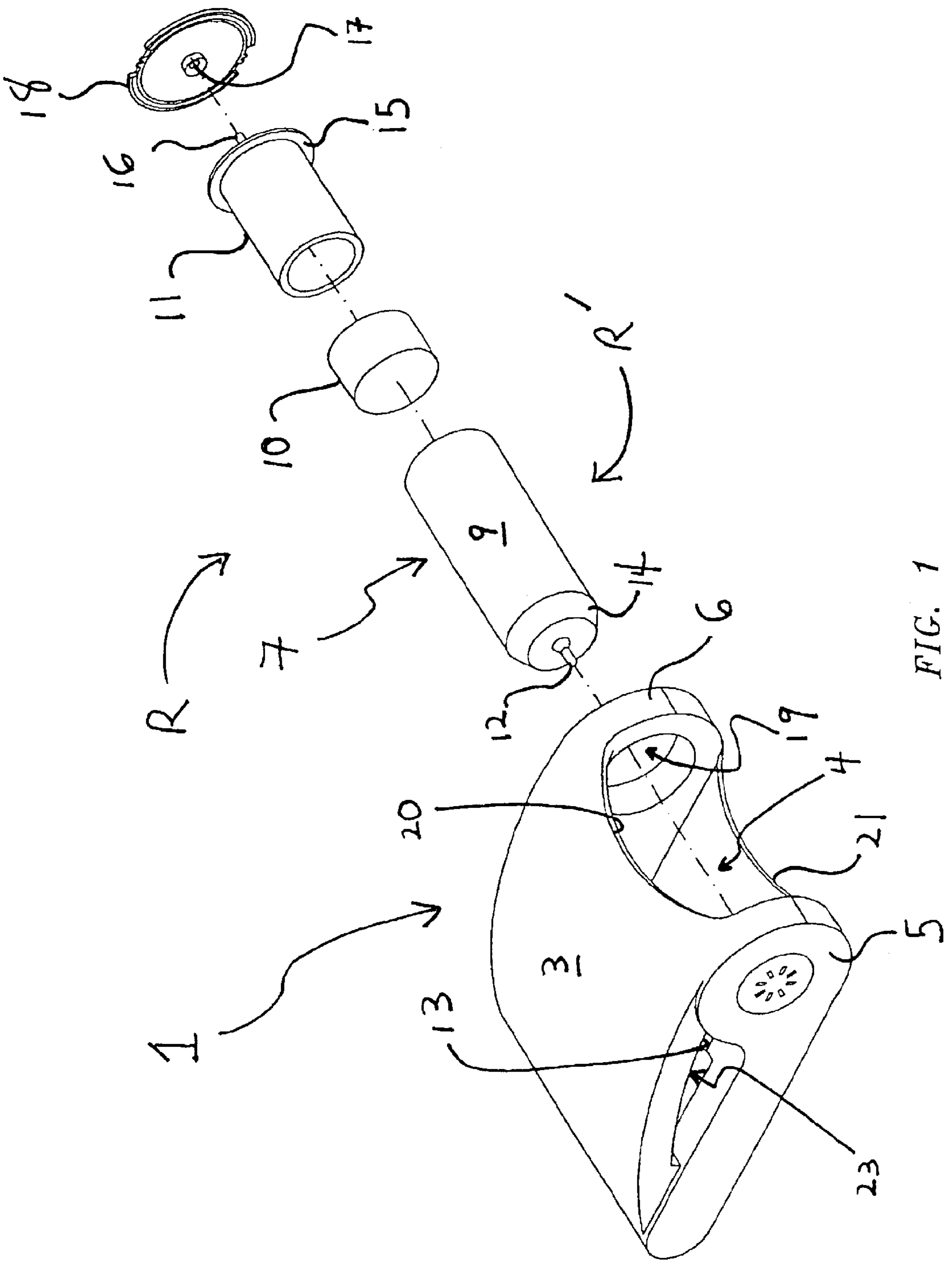
FIG. 1 is an exploded perspective view of the clip case or holder in accordance with the present invention.
Figure 2:
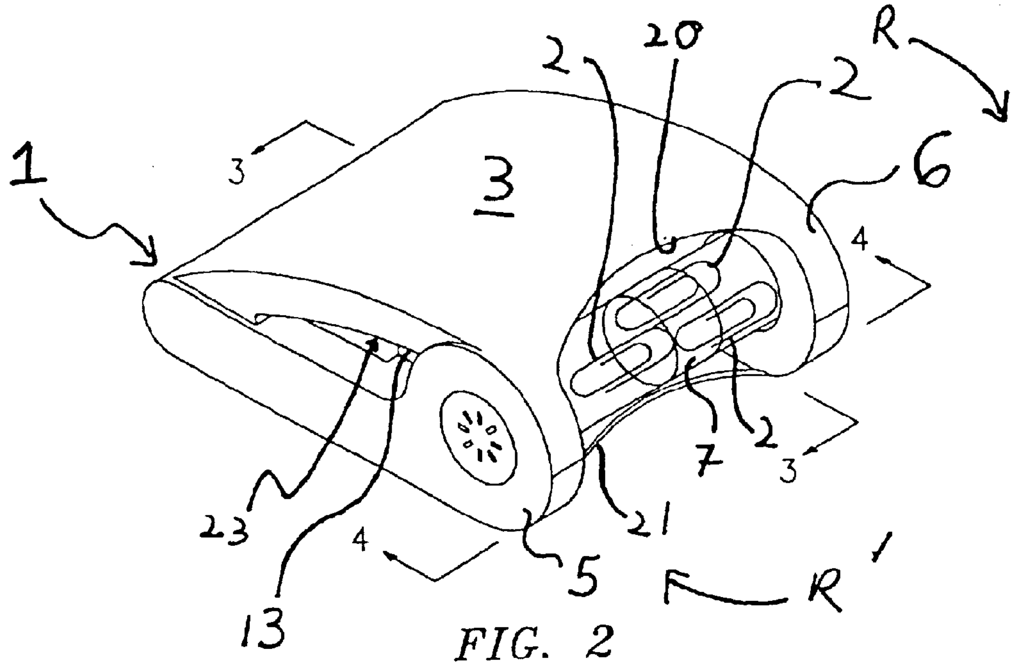
FIG. 2 is a schematic perspective view similar to FIG. 1 and illustrating storage and retrieval of paper clips.

Referring to the drawings, case or holder 1 for paper clips 2 is shown which facilitates withdrawal of the clips 2 therefrom. The holder 1 comprises a main container body 3 having an interior space for storing the paper clips 2. Both the outer container body 3 and inner storage space 4 are preferably in the shape of a wing or an aileron as shown. The higher, open front end of the container 3 has two opposed extensions or arms 5 and 6 for receiving a spindle or cylindrical member 7.

Figure 5:
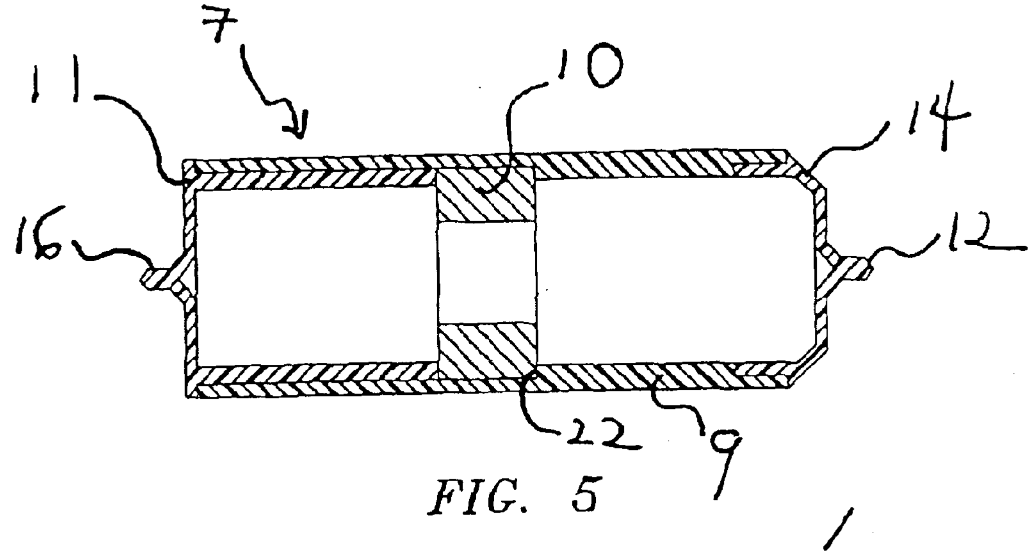
FIG. 5 is a sectional view of the rotating magnetic spindle in accordance with the present invention.

As shown in FIG. 5, the cylindrical member 7 is composed of outer hollow spindle sleeve 9, with a preferably disc-shaped isotropic ferrite magnet 20 situated within the spindle sleeve 9, and a cap 11 structured to concentrically fit within and plug the sleeve 9 at an open end thereof and retain the magnet 10 therewithin against an inner shoulder 22 on the sleeve 9. The opposite open end of the sleeve 9 is sealed by a tapered plug 14 having an axle 12 designed to seat in a notch provided within arm 5. The opposite end of the cap 11 also comprises an opposite axle 16 designed to seat in a notch 17 of a plug 18 that can be threadingly secured in opening 19 of arm 6 as shown in FIG. 1. The outer opposite end of arm 5 is closed.

The top edge 20 and bottom edge 21 of the container 3 adjacent the front open end of the container 3 are both curved or bowed in an axial direction of the spindle 7 when inserted between arms 5 and 6. As a result, the rotating spindle 7 is only supported upon arms 5 and 6 when inserted therein and does neither contacts nor is secured to a bottom surface of the container 3 when rotated, as best seen, e.g., in the sectional and front views of FIGS. 3 and 4. In other words, as shown in the front elevational view of FIG. 4, there are spaces or slots 4' and 4" axially defined both above and below the rotating spindle 7. As such, it is very easy to remove paper clips from within the container 3, e.g., by merely rotating the spindle 7 in any of two opposite directions for removing the paper clips 2. For example, spindle 7 can be rotated in the direction of arrow R in the figures to remove clips 2 from within the container 3. However, by simply rotating spindle 7 in the reverse direction, i.e. R', magnetic clips attracted upon the spindle 7 can also be removed from within the interior of the container 3.

Figure 6:
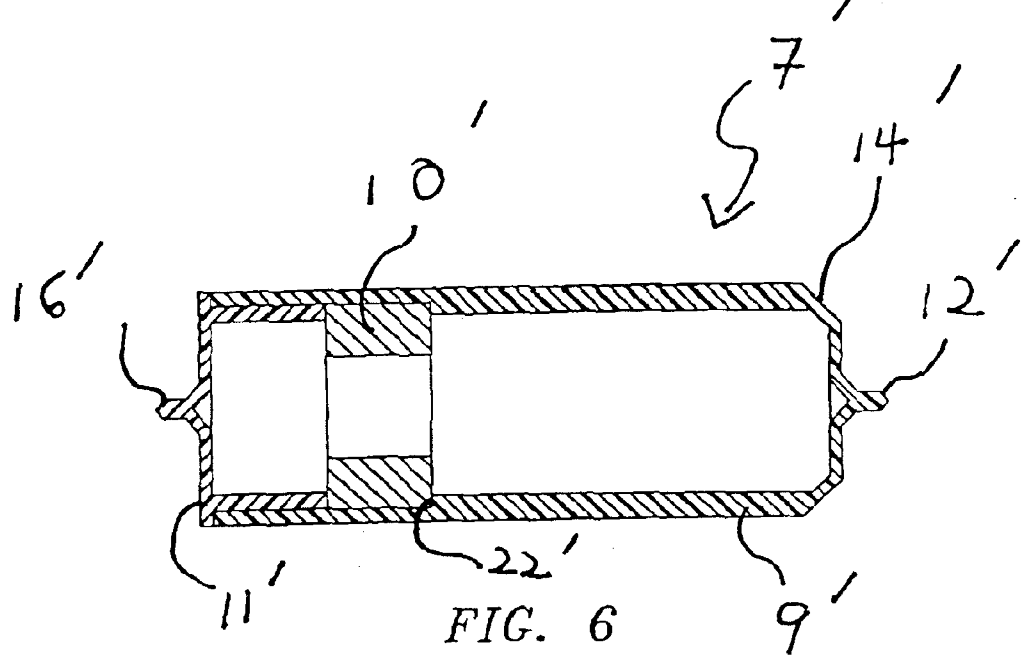
FIG. 6 is a sectional view of an alternative embodiment of the rotating magnetic spindle which can be incorporated into the case or holder.

In an alternative embodiment of the spindle 7 shown in FIG. 6 (similar components have been denoted by prime symbols), magnet 10' is secured within sleeve 9' by resting upon a shoulder 22' axially offset from an axial midpoint of the spindle 7'. Additionally, the tapered end 14' is integrally formed with the sleeve 9'. Either rotating spindle 7 (FIG. 5) or 7' (FIG. 6) can be utilized in the case or holder 1 of the present invention.

There is a lateral opening 23 provided through a side of the container 3 and through which paper clips 2 can be introduced into the container 3 between the top 30 and side leg 5 (there is no opening in the opposite side of the container 3). A ledge 13 for facilitating guidance of paper clips 2 into the container 3 is situated adjacent opening 23 substantially in the shape of an arrow.

Figure 3:
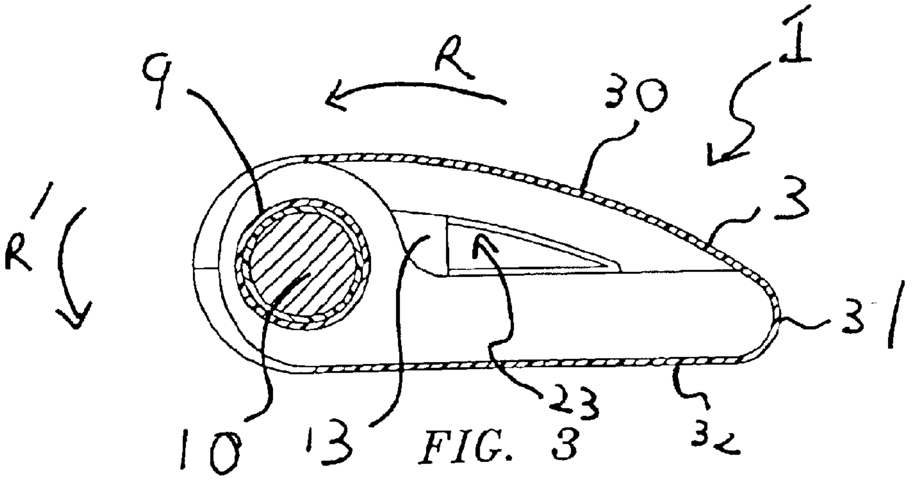
FIG. 3 is a sectional view along lines 3—3 in FIG. 2.
Figure 4:
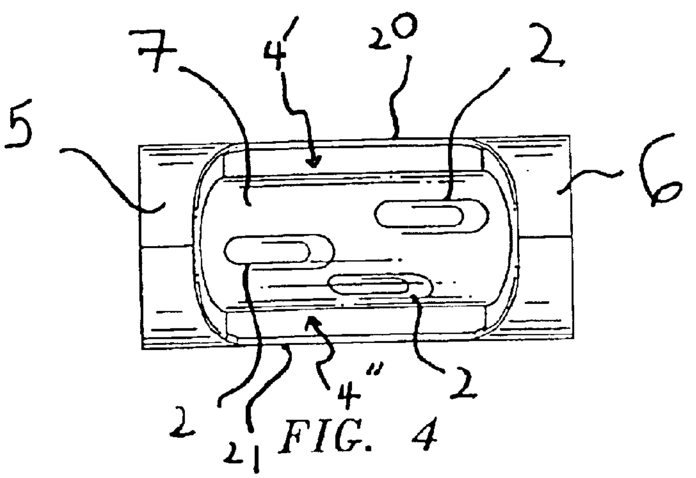
FIG. 4 is a front elevational view in the direction of arrows 4—4 in FIG. 2.
Figure 7:
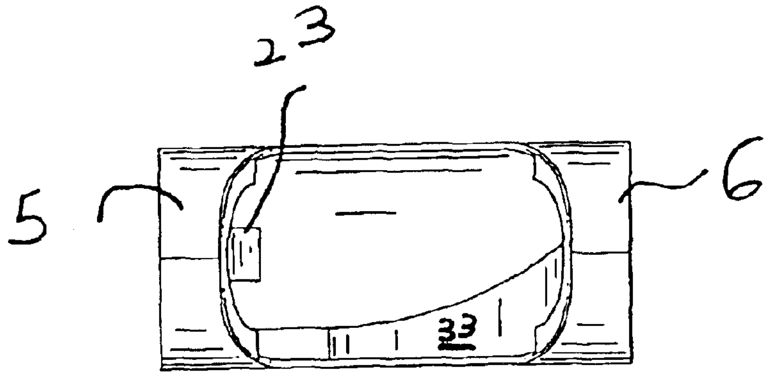
FIG. 7 is a front elevational view, similar to FIG. 4, with the spindle removed to illustrate the interior of the inventive case or holder.

Referring to FIGS. 3 and 7, a top surface 30 of the container 3 slopes rearwardly to a curved rear end 31 smaller than the open front end, with the bottom surface 32 of container 3 being substantially flat. Additionally, an interior lateral wall 33 opposite opening 23 and ledge 13 of the container 3 is tapered and curved from front to rear as shown in FIG. 7.

The inventive container 1 securely retains all paper clips 2 or like magnetic objects introduced through a side thereof by way of opening 23. At the same time, there is surprisingly no danger of the paper clips inadvertently falling out of the container 3 due to positioning of magnetic spindle 7, even though the gaps or slots 4', 4" above and below the rotating spindle 7 are quite large. Thus, paper clips 2 can be securely and reliably retained within the interior of the case 1 and removed therefrom as needed, there being no need to seal opening 23 or reduce clearance about rotating spindle 7.

The components forming the inventive clip holder 1 (other than the magnet) can be molded from hard plastic or other similar resin, with the spindle 7, e.g. sleeve 9, molded from clear or transparent plastic. The paper clips 2 themselves are nonmagnetic but magnetizable.

The preceding description of the present invention is merely exemplary and not intended to limit the scope thereof in any way.

What is claimed is:

1. A magnetic holder for paper clips or other magnetizable items, comprising a container substantially in the shape of a wing or an aileron, having an exterior surface with top and bottom portions, lateral portions, front and rear portions, said front and rear portions of said exterior surface being curved with said front portion being larger than said rear portion between said top and bottom portions, said front portion of said exterior surface being open to an interior of said holder and comprising a spindle structured and arranged to be rotatable mounted across said front opening and between said lateral portions of said exterior surface, said spindle being at least partially magnetic, and additionally comprising a second opening through one of said lateral portions into the interior of said holder, and through which items can be introduced into the interior of said holder.

2. The holder of claim 1, wherein the top portion of said exterior surface is curved, the bottom portion of said exterior surface is substantially flat, and the lateral portions of said exterior surface are substantially parallel to one another.

3. The holder of claim 2, wherein top and bottom portions of an interior surface are substantially complementary to said top and bottom portions of said exterior surface, one lateral portion of said interior surface is substantially parallel to an adjacent lateral portion of said exterior surface, and an opposite lateral portion of said interior surface curves inwardly from a front to a rear end thereof.

4. The holder of claim 1, wherein said spindle comprises an outer hollow sleeve, a magnet positioned within said sleeve and against a shoulder defined in said sleeve, and a plug structured and arranged to secure said magnet within said sleeve from a direction opposite to said shoulder.

5. The holder of claim 1, comprising slots defined both above and below said rotating spindle when said spindle is rotatably mounted upon said container and through which items adhering to said spindle can be removed from said container interior by rotating said spindle in either direction.

6. The holder of claim 1, wherein said spindle is rotatably mounted and arranged to allow removal of items from within said container by rotating in either of two opposite directions.

7. The holder of claim 6, wherein said spindle is rotatably mounted across the front opening in said hollow container to define slots both above and below said spindle for removing the items.

8. The holder of claim 7, wherein an interior of said hollow container is at least partially tapered or curved from said larger front end to smaller rear end.

* * * * *